United States Patent [19]

Kubo

[11] Patent Number: 4,541,641
[45] Date of Patent: Sep. 17, 1985

[54] SEAL MEMBER AND TOLERANCE COMPENSATOR

[75] Inventor: Kanji Kubo, Tokyo, Japan

[73] Assignee: Honda Giken Kogyo Kabushiki Kaisha, Tokyo, Japan

[21] Appl. No.: 551,298

[22] Filed: Nov. 14, 1983

[30] Foreign Application Priority Data

Nov. 24, 1982 [JP] Japan .................................. 57-206662

[51] Int. Cl.$^4$ .............................................. B23D 7/00
[52] U.S. Cl. .................................... 277/183; 277/211; 280/673
[58] Field of Search ............... 74/559, 484 R, 496; 403/162, 161; 280/673, 674, 675; 277/211, 207 R, 183

[56] References Cited

U.S. PATENT DOCUMENTS

| | | | | |
|---|---|---|---|---|
| 2,573,591 | 10/1951 | Nelson | ................................ | 277/183 |
| 2,959,431 | 11/1960 | Foss | ...................................... | 277/211 |
| 3,111,307 | 11/1963 | Cuskie | ................................. | 280/673 |
| 3,551,990 | 1/1971 | Wehner | ................................ | 280/673 |
| 3,836,183 | 9/1974 | Battle | .................................. | 277/211 |
| 3,999,768 | 12/1976 | Jepsen | ................................. | 277/183 |

Primary Examiner—Robert I. Smith
Attorney, Agent, or Firm—Lyon & Lyon

[57] ABSTRACT

A seal member and tolerance compensator which includes a body portion, an integral leg portion, and several deformable locator and sealing extensions. The leg portion is received in a compressed manner between two adjacent components of a pivotally connected assembly which have axial tolerances. At least one of the surfaces of the leg portion is provided with grooves and projections such that when the projections are compressed between adjacent components by relative motion within the assembly or tolerances within the assembly, the elastic material of the protrusions will flex into the surrounding grooves.

4 Claims, 5 Drawing Figures

SEAL MEMBER AND TOLERANCE COMPENSATOR

The present invention relates to a seal member capable of compensating for the combined tolerances of a set of assembled parts. Whenever an object is produced, the size of that object is always subject to slight variations known as tolerances. When a structure is assembled from a number of parts, each with a certain amount of tolerance in the axial direction, the combined effect of these tolerances can make assembly of the structure difficult, if not impossible. In addition, large clearances or looseness may result in the axial direction as a result of these combined tolerances which results in a structure that performs unsatisfactorily.

As will be fully understood from the description, the object of this invention is to provide a seal member capable of compensating for the dimensional tolerances in the axial direction by its own elastic deformation. In addition, another object of this invention is to provide a seal member which will maintain its position relative to the surrounding components even when the member is subjected to external forces. This is accomplished by using an annular body portion which fits around the outermost component of the assembly.

The seal member and tolerance compensator of this invention is made from an elastically deformable material and has a base portion which abuts the outermost component; an integral leg portion which is compressed between two adjacent components and has a series of grooves and protrusions formed circumferentially on at least one face; and, flexible locator extensions which are compressed against the side wall of the seal enclosure to maintain the relative position of the invention. This results in a seal member and tolerance compensator which is capable of acting as a seal while conforming to the amount of tolerance present in the axial direction and maintaining its position relative to adjacent components.

The accompanying drawings in combination show one embodiment of the invention, in which.

A preferred embodiment of the invention will be described in detail with reference to the accompanying drawings. The invention is described as it relates to a seal member and tolerance compensator used with an upper arm of a suspension system without limitation as to its scope of uses with similar components in a different situation.

Figure 1:
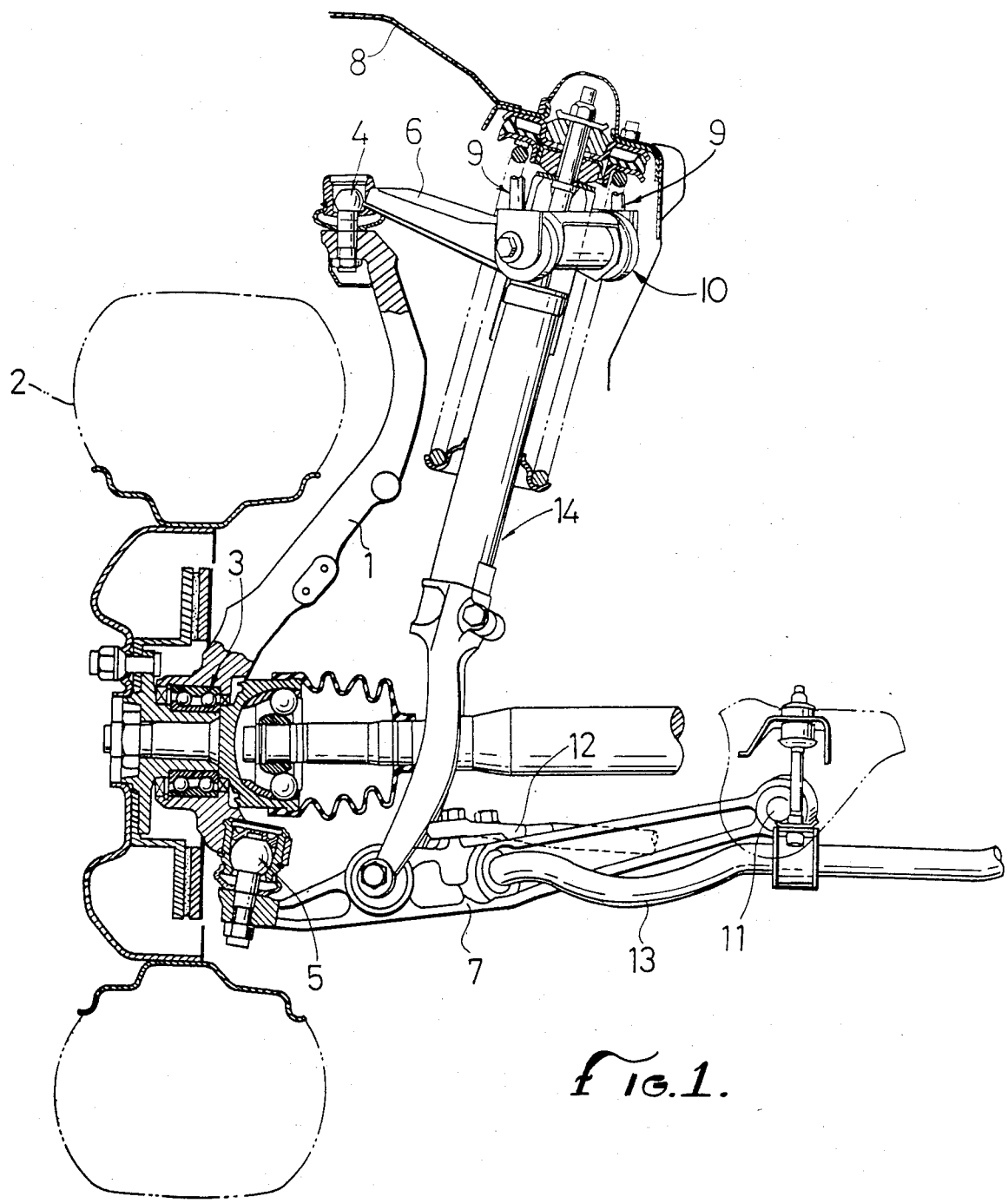
FIG. 1 is a partially cross-section rear-elevational view of a vehicle suspension system.

FIG. 1 shows a suspension system which comprises a knuckle arm 1 which rotatably supports a wheel 2 via bearing means 3. The knuckle arm 1 is equipped with a ball joint 4 at its upper end, which is connected to one end of an upper arm 6, and a ball joint 5 at its lower end 3 which is connected to one end of a lower arm 7.

The upper arm 6 is inclined rearwardly with respect to the vehicle body. The upper arm 6 is pivotally supported by an assembly, generally designated 10, within a cylindrical housing 6a at its end opposite the ball joint 4. This enables the end of the arm which encompasses the ball joint 4 to move vertically. The upper arm pivotal connection assembly 10 is in turn supported by an upper arm support structure 9 mounted onto the upper vehicle body frame 8. The lower arm 7 is also connected to the knuckle arm 1 at one end by a lower ball joint 5. The other end of the lower arm 7 is pivotally connected 11 to the vehicle body frame. Thus, the end of the lower arm encompassing the lower ball joint 5 is also able to move vertically. Connected to the middle portion of the lower arm is a radius rod 12 and a stabilizer 13. The radius rod 12 slants forward from the lower arm 7 while the stabilizer 13 slants rearward from the lower arm 7. Mounted between the vehicle body 8 and the lower arm 7 is a shock absorber 14.

Figure 2:
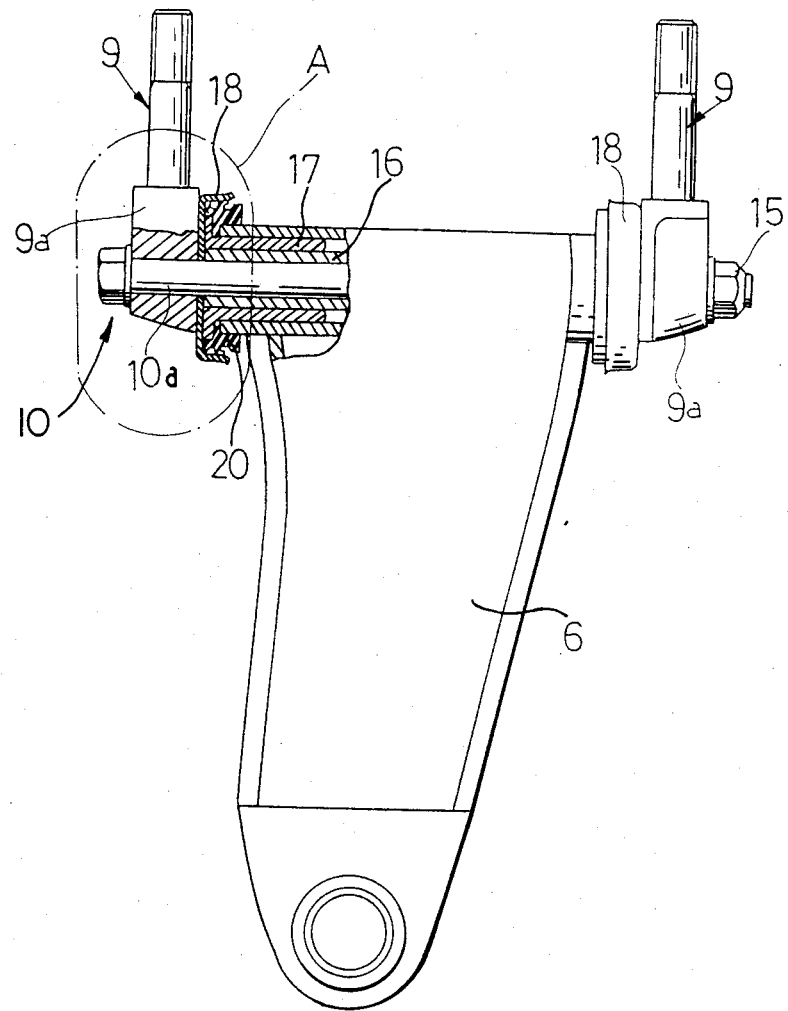
FIG. 2 is a partially cross-sectional plan view of an upper arm of the suspension system.
Figure 3:
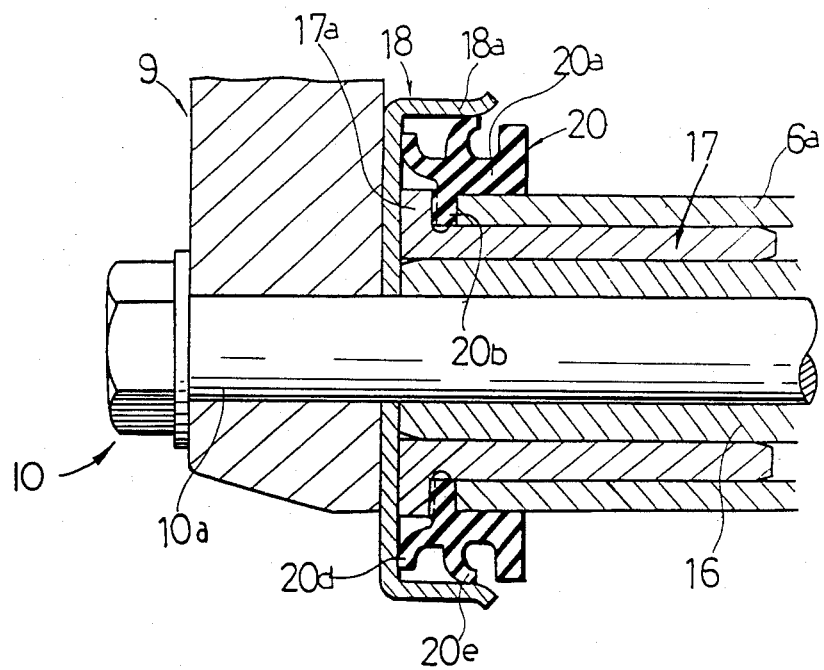
FIG. 3 is an enlarged view of the portion A in FIG. 2.

Referring to FIGS. 2 and 3, the upper arm's pivotal connection assembly 10 consists of a collar 16 which is aligned inside of the cylindrical housing 6a and between the two ends of the upper arm support mechanism 9. A bolt 10a extends through the holes in the upper arm support structure 9 and through the collar 16 and is fixed at its end by a nut 15. Fitted into the gap between the collar 16 and the upper arm cylindrical housing 6a is a bushing 17. Thus, the upper arm cylindrical housing 6a, and therefore the entire upper arm 6, is rotatable about the axis of the bolt 10a. It should be noted that in FIG. 2 the arm 6 is shown in a downwardly extending position for convenience of illustration but normally the arm 6 extends generally in a horizontal direction as shown in FIG. 1.

Figure 4:
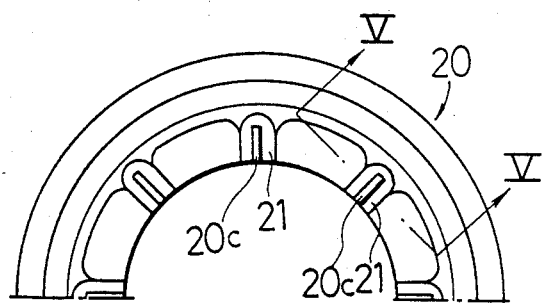
FIG. 4 is a side view of the seal member removed from the assembly.
Figure 5:
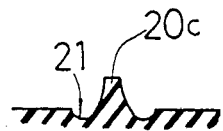
FIG. 5 is a cross-sectional view of a portion of the seal member taken along the line V—V in FIG. 4.

Between each end of the upper arm support structure 9 and the collar 16 is a seal housing 18 having a flange 18a. The seal member and tolerance compensator 20 is designed to be mounted around the cylindrical housing 6a of the upper arm 6 and within the seal housing 18. As shown in FIGS. 3 and 4, the annular seal member and tolerance compensator 20 includes an annular body portion 20a and an integral leg portion 20b which projects inwardly from the annular body 20a. FIG. 4 details the surface of the leg portion 20b which abuts against the flange 17a of the bushing 17. The leg portion 20b has a multiplicity of U-shaped grooves 21 each encircling a protrusion 20c which projects beyond the surface level of the leg portion 20b as shown in FIG. 5. The grooves 21 are formed on the side of the leg portion 20b which abuts against the flange 17a of the bushing 17. In addition, the seal member and tolerance compensator is provided with two flexible locator extensions, 20d and 20e, which project from the base 20a of the seal member and tolerance compensator 20 in the axial and radial directions, respectively.

When the components of the pivoting connection of the upper arm are fully assembled, the leg portion 20b of the seal member and tolerance compensator 20 is fitted in a compressed manner between the flange 17a of the bushing 17 and the cylindrical housing 6a of the upper arm 6. The flexible locator extensions, 20d and 20e, are compressed and in slideable contact with the inner surface of the flange 18a of the seal housing 18.

When a wheel 2 vibrates up and down due to the roughness of a road while driving, the upper arm 6 and the lower arm 7 each connected to the upper and lower ends of the knuckle arm 1, respectively, swing up and down about their pivotal connections 10 and 11, respectively, to the vehicle body 8. The leg portion 20b of the seal member and tolerance compensator 20 deforms with this movement in the suspension system such that the projections 20c are forced to be flattened due to this movement.

The elasticity of the material enables the projections to flex into the surrounding U-shaped grooves 21 which encircle each protrusion 20c so that the seal member and tolerance compensator 20 can effectively absorb the axial dimensional tolerances of all of the components and still provide a seal when these components are in relative motion. The flexible locator extensions 20d and 20e act to maintain the relative position of the seal member and tolerance compensator 20 relative to the components of the system and to exclude any foreign material, such as dirt and are in sealing relationship therewith water, from the assembly.

We claim:

1. A circular seal member and tolerance compensator made from an elastic material, comprising, a base portion having an opening of a predetermined size, a leg portion, said leg portion having two axially directed faces and a series of radially extending grooves and protusions of predetermined radii and height, respectively, formed in at least one face, and means to maintain the position of said seal member and tolerance compensator.

2. An annular seal member and tolerance compensator for a pivoting arm support assembly with a bushing, a housing, and an enclosure, made from an elastic material, comprising, a base formed to fit around the housing, an integral leg portion projecting inwardly from said base and compressed between the housing and the bushing, radially extending grooves and protrusions formed on the side of said leg facing the bushing, and flexible locator extensions abutting the flange in sealing relationship.

3. An annular seal member and tolerance compensator for a series of components, made from an elastic material and surrounded by an enclosure, comprising, a base, said base portion positioned around one component, an integral leg portion with two axially directed faces, said leg projecting inwardly from said annular base and compressed between two components, radially extending grooves and projections formed on at least one face of said leg, and flexible locator extensions being compressed against the enclosure walls in sealing relationship.

4. An annular seal member and tolerance compensator for a pivoting arm support assembly with a bushing, a housing, and an enclosure, made from an elastic material, comprising, a base portion formed to fit around the housing, an integral leg portion projecting radially inwardly from said base and compressed between the housing and the bushing, radially extending grooves and protrusions on at least one side of said leg, said grooves and protrusions being formed on an axially directed face of said leg, said protrusions being of a predetermined axial length such that the protrusion extends axially beyond the face of the leg and of a radial length of a predetermined size greater than the circumferential width of said protrusion, said grooves encircling three sides of said protrusion in a substantially U-shaped configuration extending into the face of the leg on which it is formed, a multiplicity of said protrusions and U-shaped grooves encircling said protrusions being formed circumferentially about the entire face of said leg, and flexible locator extensions abutting the flange in sealing relationship.

* * * * *

UNITED STATES PATENT AND TRADEMARK OFFICE
CERTIFICATE OF CORRECTION

PATENT NO. : 4,541,641
DATED : Sept. 17, 1985
INVENTOR(S) : Kanji Kubo

It is certified that error appears in the above—identified patent and that said Letters Patent is hereby corrected as shown below:

Column 2, line 12 after "lower arm" insert --7--.
Column 3, line 13, after "system and" insert --are in sealing relationship therewith--.
Column 3, line 14 after "dirt and" delete --are in sealing relationship therewith--.

Signed and Sealed this

Eighteenth Day of March 1986

[SEAL]

Attest:

DONALD J. QUIGG

Attesting Officer

Commissioner of Patents and Trademarks